A. L. HANSEN.
PROCESS FOR MAKING GAS TIPS.
APPLICATION FILED JUNE 5, 1914.
1,147,018.
Patented July 20, 1915.
Fig. 1.
Fig. 3.
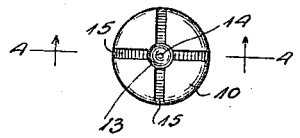
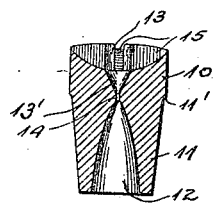
Fig. 2.
Fig. 4.
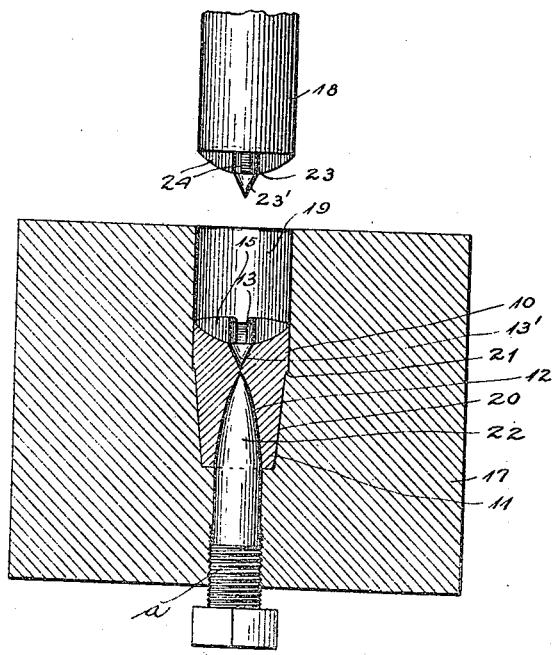
Fig. 5.
WITNESSES:
C. J. Schmidt
L. Bullwinkel
INVENTOR.
Augus L. Hansen
BY
Offield, Towle, Graves & Offield
ATTORNEYS.

UNITED STATES PATENT OFFICE.

AUGIE L. HANSEN, OF CHICAGO, ILLINOIS, ASSIGNOR TO JUSTRITE MANUFACTURING COMPANY, OF CHICAGO, ILLINOIS, A CORPORATION OF ILLINOIS.

PROCESS FOR MAKING GAS-TIPS.

1,147,018. Specification of Letters Patent. Patented July 20, 1915.

Application filed June 5, 1914. Serial No. 843,138.

*To all whom it may concern:*

Be it known that I, AUGIE L. HANSEN, a citizen of the United States, and a resident of Chicago, in the county of Cook and State of Illinois, have invented certain new and useful Improvements in Processes for Making Gas-Tips, of which the following is a specification.

My invention relates to an improved process for making metal gas tips.

I am aware that metal tips have been made but these have all been formed up from sheet metal. The construction of such sheet metal tips requires a number of operations which makes the cost of manufacture considerable. Furthermore, such sheet metal tips, although being less fragile than, for example, lava tips, are not very rigid and will readily bend under pressure particularly when tools are applied to remove them from their setting.

The object of my invention is to provide an improved process for inexpensively manufacturing such metal tips, my improved process involving only a single die operation for forming the tip from a solid block of ductile metal, as for example aluminum. In such single die operation an inlet chamber and an outlet or mixing chamber are formed in opposite ends of the solid blank by displacement of the metal and in the same operation air inlets or ducts to the outlet or mixing chamber are formed, the chambers after the die operation terminating a short distance from each other and the intervening metal being then pierced as by drilling to get an outlet aperture of desired area.

By referring to the accompanying sheet of drawings my improved tip and process will be clearly understood.

In the drawing Figure 1 is an elevational view of a cylindrical block of metal from which a tip is to be formed, Fig. 2 is a side elevational view of a finished tip, Fig. 3 is a top view thereof, Fig. 4 is a sectional view on plane 4—4, Fig. 3, and Fig. 5 shows how the tip is formed in a die.

Referring to Figs. 2, 3 and 4, the tip has the cylindrical head 10 and the tapering body 11 for firmly engaging a supporting seat, a shoulder 11' being shown between the body and head for engaging the outer edge of the seating support. The body part has the axial conical bore 12, while the head has the axial cylindrical bore 13 whose lower end 13' is conical, this bore forming a mixing chamber. The inner ends or apexes of the bores are connected by the outlet aperture 14 of suitable cross section depending upon the volume of gas desired to be delivered by the tip. Extending radially to the bore or mixing chamber 13 from the upper face of the body 10 are the segmental air passageways or channels 15, the air entering these channels and mixing in the chamber 13 with the gas issuing from the aperture 14.

Describing now the manner of making the tips, the cylindrical blanks or blocks 16 are cut from metal stock bars, preferably aluminum. In Fig. 6 I have diagrammatically represented a lower die member 17 and an upper die member 18. The lower die member has the cylindrical upper section or pocket 19 and the lower conical or tapered section 20, the shoulder 21 being provided between the two sections. The lower conical section 20 corresponds in shape to the desired shape of the body 11 of the tip to be formed, and the upper section 19 has the diameter of the head 10 of the tip and of the block 16 from which the tip is to be formed, a block being inserted in the cylindrical section 19 of the die to rest against the shoulder or ridge 21. Extending upwardly into the lower section 20 of the die is the tongue 22 whose shape corresponds to the desired shape of the bore 12 of the tip to be formed, and as shown this tongue may be the upper end of a screw *a* threaded to the die block. The upper die member 18 is cylindrical and adapted to enter the die pocket 19 and its lower end has the axial cylindrical tongue 23 with the conical end 23' for forming the chambers 13 and 13' of the tip, and the radial segmental extensions or wings 24 on the die member are shaped in accordance with the desired air passageways 15. After a blank 16 has been inserted in the die member 17, the die member 18 is caused to enter the die pocket 19 and is forced against the blank therein and the metal of the blank is displaced and worked by the various die member tongues and projections and forced to the bottom of the die member 17 and around the tongue 22. As shown in Fig. 6, the tip is then complete with the exception of the aperture 14. Such aperture could be formed during the die operation but owing to its small diameter the die points would have to be very small and would readily break. Furthermore, different sizes of aperture may be desired. It is therefore preferable to form the aperture after the die operation. The tongues 22 and 23' are therefore of such length that after the die operation the apex ends of the chambers 12 and 13 will be within a short distance of each other and separated only by a thin web of metal. This metal is then pierced by a drill or other tool to produce a gas outlet aperture of desired area, and such piercing operation can be very rapidly and inexpensively accomplished by simple machinery.

I thus produce by a very inexpensive process a strong tip which will not crush or distort when handled and which is very accurate in its control of combustion. I do not, of course, desire to be limited to the precise form of tip shown or to the particular die mechanism shown. In practice the die mechanism will of course have well known ejecting and other attachments which do not form part of the present invention.

I claim as follows:

1. The process of making a gas tip which consists in displacing the metal of a solid block to form chambers in the opposite ends thereof, and a restricted gas aperture connecting the chambers.

2. The process of making a gas tip which consists in displacing the metal of a solid cylindrical block of metal to form bores in the opposite ends thereof to within a short distance of each other, and then piercing the metal between the bores to form the desired restricted gas aperture.

3. The process of making a metal gas tip which consists in displacing the metal of a solid block by a single die operation to form the tip body and gas passageways in the opposite ends thereof to within a short distance of each other near the top of the body, and then piercing the remaining metal between the passageways to form the desired gas aperture 4. The improved process of making a metal gas tip which consists in displacing a solid block of metal in a die around upper and lower die tongues to form the tip body and an inlet chamber and an outlet chamber therein to within a short distance of meeting, and at the same time displacing the metal about die webs to form radial air passageways to the outlet chamber, and then piercing the metal between the inlet and outlet chambers to form a gas aperture of desired area.

5. The improved process of making a metal tip which consists in displacing the metal of a solid block by a single die operation to form the tip body comprising an inlet chamber and an outlet chamber separated by a thin web of metal, and air passageways to the outlet chamber, and then piercing the metal between the inlet and outlet chambers to form a restricted gas aperture.

6. The process of making a gas tip which consists in displacing the metal of a solid block to form a chamber therein and a restricted gas aperture connecting therewith.

In witness whereof, I have hereunto set my hand this 3rd day of June, A. D., 1914.

AUGIE L. HANSEN.

Witnesses:
CHARLES J. SCHMIDT,
LURLINE BULLWINKLE.